United States Patent
Middleton

(10) Patent No.: US 11,532,959 B2
(45) Date of Patent: Dec. 20, 2022

(54) ELECTRIC SUBMERSIBLE PUMP MOTOR STABILIZED BY ELECTROMAGNETICS

(71) Applicant: ElectromagnetiX LLC, Shawnee, OK (US)

(72) Inventor: Christopher Martin Middleton, Meeker, OK (US)

(73) Assignee: ElectromagnetiX LLC, Shawnee, OK (US)

( * ) Notice: Subject to any disclaimer, the term of this patent is extended or adjusted under 35 U.S.C. 154(b) by 0 days.

(21) Appl. No.: 17/447,031

(22) Filed: Sep. 7, 2021

(65) Prior Publication Data

US 2022/0077730 A1 Mar. 10, 2022

Related U.S. Application Data

(60) Provisional application No. 62/706,740, filed on Sep. 7, 2020, provisional application No. 62/706,739, filed on Sep. 7, 2020.

(51) Int. Cl.
*H02K 1/18* (2006.01)
*E21B 43/12* (2006.01)
(Continued)

(52) U.S. Cl.
CPC .......... *H02K 1/182* (2013.01); *E21B 43/128* (2013.01); *F04D 13/086* (2013.01); *H02K 1/16* (2013.01);
(Continued)

(58) Field of Classification Search
CPC .......... H02K 1/16; H02K 1/165; H02K 1/18; H02K 1/182; H02K 1/27; H02K 1/272;
(Continued)

(56) References Cited

U.S. PATENT DOCUMENTS

| 5,036,235 A | 7/1991 | Kleckner |
| 6,191,513 B1 * | 2/2001 | Chen ................ F16C 32/047 |
| | | 310/90 |

(Continued)

FOREIGN PATENT DOCUMENTS

DE 4008639 A1 9/1991

OTHER PUBLICATIONS

ISA; "International Search Report and Written Opinion"; dated Feb. 14, 2022; 18 pages.

*Primary Examiner* — Rashad H Johnson
(74) *Attorney, Agent, or Firm* — Hall Estill Law Firm

(57) ABSTRACT

An electric submersible pump (ESP) that has a motor section for driving the ESP. The motor section has a stator has an inner surface, winding channels disposed axially therein and windings disposed in the winding channels to generate an electromagnetic field when power is supplied to the ESP. The motor section also has a rotor rotatably disposed in the stator. The rotor has permanent magnets or induction windings disposed therein that are responsive to the electromagnetic field to facilitate rotation of the rotor relative to the stator. The motor section also includes a manipulated air gap disposed between the rotor and the stator that the electromagnetic field crosses. The manipulated air gap provides a desired constant radially directed load on the rotor to stabilize the rotor when instability of the motor section occurs. A method of designing and constructing the ESP disclosed herein. To design and construct the ESP, a desired constant radially directed load is determined for an electric submersible pump (ESP) to stabilize the ESP when instability of an electromagnetic field of the ESP occurs. The air gap is manipulated to achieve the desired constant radially directed load or the design of a stator of the ESP is manipulated to (Continued)

achieve the desired constant radially directed load. The ESP can then be constructed.

20 Claims, 6 Drawing Sheets

(51) Int. Cl.
| | | |
|---|---|---|
| *H02K 15/02* | (2006.01) | |
| *H02K 3/48* | (2006.01) | |
| *H02K 1/16* | (2006.01) | |
| *F04D 13/08* | (2006.01) | |
| *H02K 1/272* | (2022.01) | |
| *H02K 7/14* | (2006.01) | |
| *H02K 15/03* | (2006.01) | |

(52) U.S. Cl.
CPC ............. *H02K 1/165* (2013.01); *H02K 1/272* (2013.01); *H02K 3/48* (2013.01); *H02K 7/14* (2013.01); *H02K 15/024* (2013.01); *H02K 15/03* (2013.01)

(58) Field of Classification Search
CPC .......... H02K 3/48; H02K 7/14; H02K 15/024; H02K 15/03; F04D 13/086
USPC .................................... 310/71, 192
See application file for complete search history.

(56) References Cited

U.S. PATENT DOCUMENTS

| | | | |
|---|---|---|---|
| 6,201,329 B1* | 3/2001 | Chen | .................... F16C 32/0444 |
| | | | 417/423.1 |
| 8,770,271 B2 | 7/2014 | Fielder et al. | |
| 9,621,014 B2 | 4/2017 | Yang et al. | |
| 2013/0169074 A1 | 7/2013 | Hussain et al. | |
| 2017/0264179 A1 | 9/2017 | Khotsyanov et al. | |
| 2021/0384785 A1* | 12/2021 | Remboski | ................ H02K 3/16 |
| 2022/0290718 A1* | 9/2022 | Jolly | ..................... F16C 25/086 |

\* cited by examiner

ELECTRIC SUBMERSIBLE PUMP MOTOR STABILIZED BY ELECTROMAGNETICS

CROSS-REFERENCE TO RELATED APPLICATIONS

The present application is a conversion of U.S. Provisional Application having U.S. Ser. No. 62/706,739, filed Sep. 7, 2020 and U.S. Provisional Application having U.S. Ser. No. 62/706,740, filed Sep. 7, 2020, which claims the benefit under 35 U.S.C. 119(e). The disclosures of which are hereby expressly incorporated herein by reference.

STABILIZED BY ELECTROMAGNETICS STATEMENT REGARDING FEDERALLY SPONSORED RESEARCH OR DEVELOPMENT

Not applicable.

BACKGROUND OF THE DISCLOSURE

1. Field of the Disclosure

The present disclosure relates to an electrical submersible pump (ESP) using electromagnetics to stabilize portions of the ESP for increased reliability.

2. Description of the Related Art

ESPs are commonly used in the oil industry to provide artificial lift in wells where pressure is insufficient to produce oil to the surface. ESPs are supported by hydrodynamic bearings and can experience radial and axial loads during operation. Hydrodynamic bearings operate with a thin layer of lubricating oil between stationary and rotating sections of the bearings. The radial and axial loads can cause certain parts of the ESPs to become unstable under certain speeds and loads, which can cause the rotating parts of the bearings to come in contact with the stationary parts of the bearings. Rotating and stationary components of the bearing are separated by a layer of lubricating oil. The oil creates pressures through shear forces that separate the rotating "bearing sleeve" or "journal" from the stationary "bearing". If the oil pressure that creates the separating force collapses or is overcome then the rotating and stationary parts make contact and damage each other.

A pre-load is a stationary force vector in the radial direction and aids in aligning the shear forces of the oil to yield stable pressures thus reducing the possibility of bearing contact. When the shaft is oriented horizontally, the force of gravity provides the stationary force vector for pre-load, but that force is negated when the motor orientation positions the shaft vertically. Accordingly, there is a need for an ESP that has a constant pre-load force to prevent bearing instability and increase the life of ESPs.

SUMMARY OF THE DISCLOSURE

The present disclosure is directed toward an electric submersible pump (ESP) that has a motor section for driving the ESP. The motor section has a stator has an inner surface, winding channels disposed axially therein and windings disposed in the winding channels to generate an electromagnetic field when power is supplied to the ESP. The motor section also has a rotor rotatably disposed in the stator. The rotor has permanent magnets or induction windings disposed therein that are responsive to the electromagnetic field to facilitate rotation of the rotor relative to the stator. The motor section also includes a manipulated air gap disposed between the rotor and the stator that the electromagnetic field crosses. The manipulated air gap provides a desired constant radially directed load on the rotor to stabilize the rotor when instability of the motor section occurs.

The present disclosure is also directed to a method of desiging and constructing the ESP disclosed herein. To design and construct the ESP, a desired constant radially directed load is determined for an electric submersible pump (ESP) to stabilize the ESP when instability of an electromagnetic field of the ESP occurs. The air gap is manipulated to achieve the desired constant radially directed load or the design of a stator of the ESP is manipulated to achieve the desired constant radially directed load. The ESP can then be constructed.

DETAILED DESCRIPTION OF THE DISCLOSURE

Figure 1:
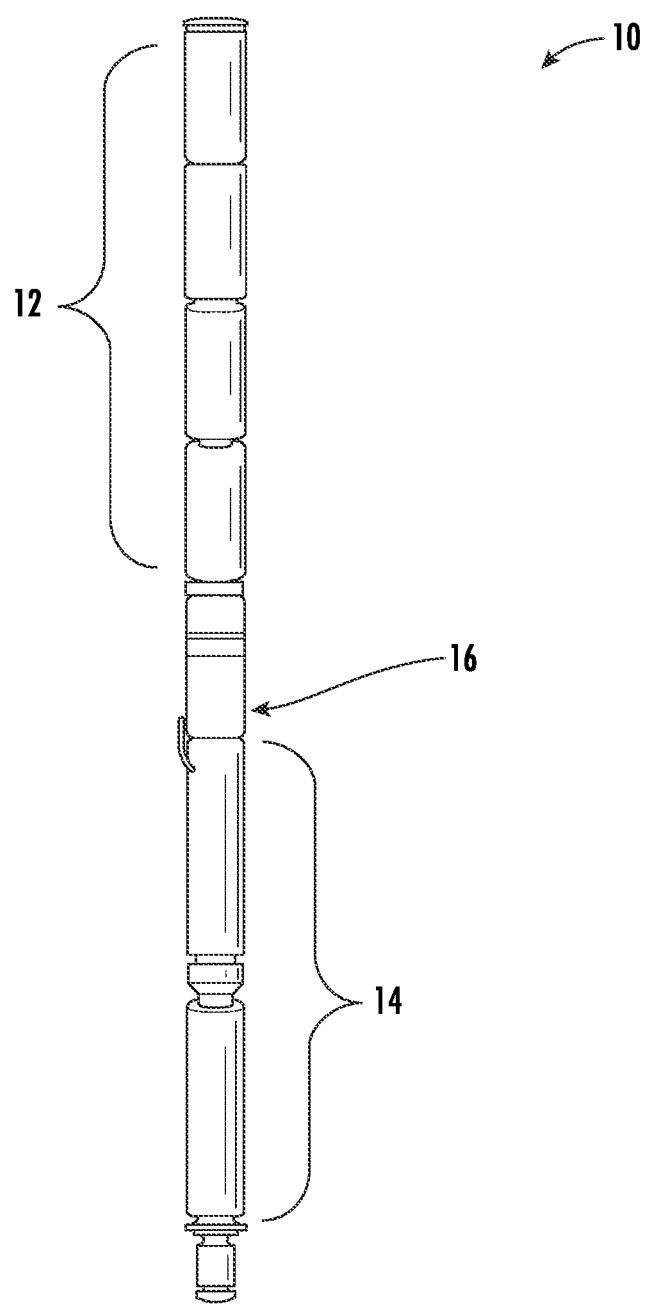
FIG. 1 is a side elevation view of an electric submersible pump (ESP) constructed in accordance with the present disclosure.

Referring now to the drawings, FIG. 1 and the present disclosure is directed to an electrical submersible pump (ESP) 10 that includes a centrifugal pump 12 driven by a motor section 14 that is stabilized using electromagnetics. The ESP 10 can also include a seal section 16 that separates the motor section 14 from centrifugal pump 12 to equalize internal pressure of lubricant within the motor section 14 to the pressure of the wellbore.

Figure 2:
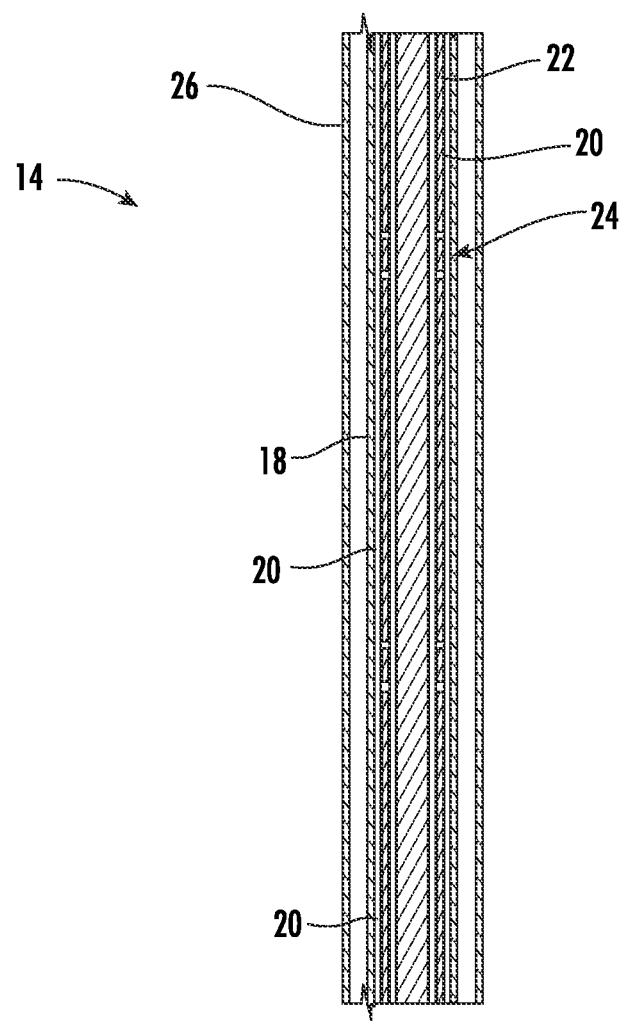
FIG. 2 is side elevation view of a motor section of the ESP constructed in accordance with the present disclosure.

FIG. 2 shows the motor section 14 of the ESP 10. The motor section 14 includes a stator 18, at least one rotor 20 rotatably disposed within the stator 18 and a shaft 22 that extends at least partially through the rotor 20 (and motor section 14) and the stator 18. The shaft 22 also extends through the seal section 16 and at least partially into the centrifugal pump section 12 to operate various parts of the centrifugal pump section 12. The shaft 22 is securely disposed to the rotor 20 so that when the rotor 20 turns in the stator 18, the shaft 22 turns as well. The ESP 10 also includes bearing assemblies 24 that support the shaft 22 that extend out of the rotor 20, or between rotors 20 if there are more than one, and through the bearing assemblies 24. The rotors 20, the stator 18 and the bearing assemblies can be disposed inside a housing 26.

Figure 3A:
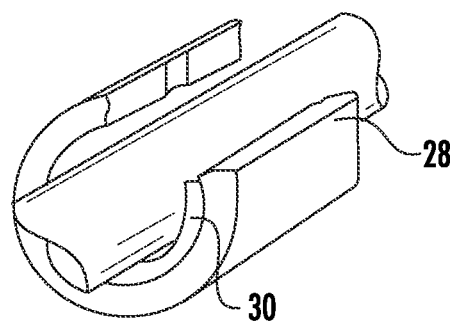
FIG. 3A is a perspective view of a journal (hydrodynamic) bearing constructed in accordance with the present disclosure.
Figure 3B:
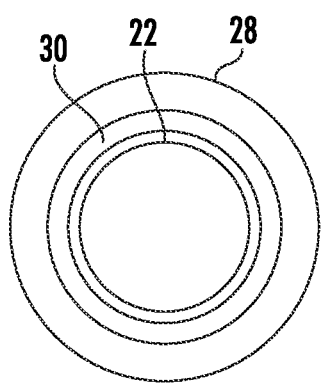
FIG. 3B is a cross-sectional view of the journal bearing constructed in accordance with the present disclosure.

Referring now to FIGS. 3A and 3B, shown therein is an exemplary bearing assembly 14. The bearing assembly 24 can include a bearing housing 28 with a bearing sleeve 30 disposed therein. The bearing sleeve 30 is designed such that the shaft 22 can extend therethrough and have a clearance volume disposed between the shaft 22 and the bearing sleeve 30 wherein a lubricant can be disposed between the bearing sleeve 30 and the shaft 22 and between the bearing sleeve 30 and the bearing housing 28. The lubricant disposed between the bearing sleeve 30 and the shaft 22 creates a hydrodynamic bearing and facilitates the controlled rotation of the shaft 22. The bearing sleeve 30 is allowed to rotate within the bearing housing 28. The shaft 22 can also have a sleeve attached thereto that rotates within the bearing sleeve 30. It should be understood and appreciated that any type of bearing used with ESPs can be implemented with the ESP 10 disclosed herein.

Figure 4A:
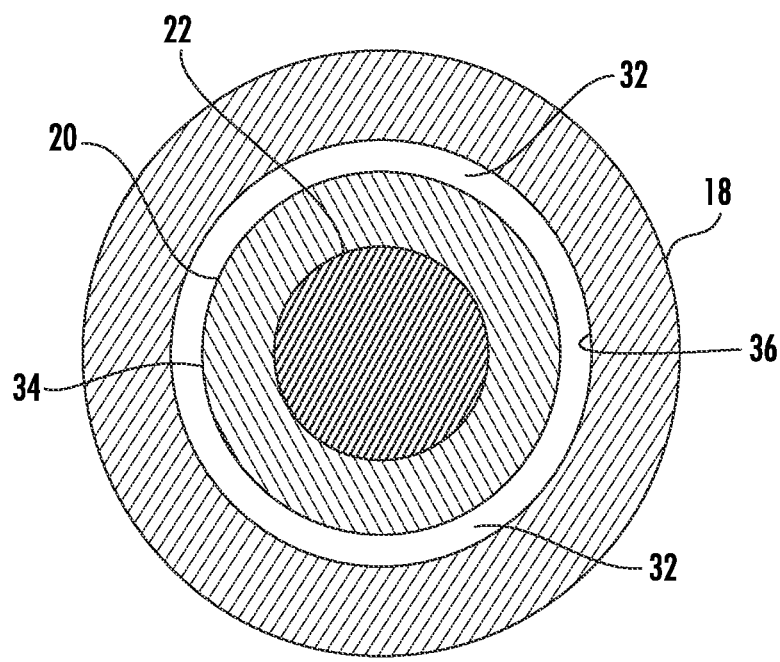
FIG. 4A is a cross-sectional view of a portion of one embodiment of the motor section constructed in accordance with the present disclosure.

FIGS. 4A-4D show a cross sectional views of a part of the stator 18, the rotor 20 and the shaft 22. An air gap 32 is shown disposed between an outside portion 34 of the rotor 20 and an inner surface 36 of the stator 18. The rotors 20, via permanent magnets and/or induction windings, and the stator 18, via windings disposed therein, can be magnetized to create an electromagnetic field that crosses the air gap 32. This electromagnetic field generates torque between the stator 18 and the rotor 20, which causes the rotor 20 to rotate relative to the stator 18. FIG. 4A shows a typical symmetrical air gap 38, the electromagnetic forces between the rotor 20 and stator 18 are balanced radially about the rotor 20 and therefore there is no constant load dominate in any direction and permits damage to the bearing assemblies 24 when instability occurs in the oil film of the bearing which can be excited by imbalance loads during operation of the ESP 10. The imbalanced load on the shaft 22, via the rotor 20, can cause the bearing sleeve 30 to be forced through the lubricant in the bearing assemblies 24 and make physical contact with the bearing housing 28, which shortens the operable life of the bearing assemblies.

Figure 4B:
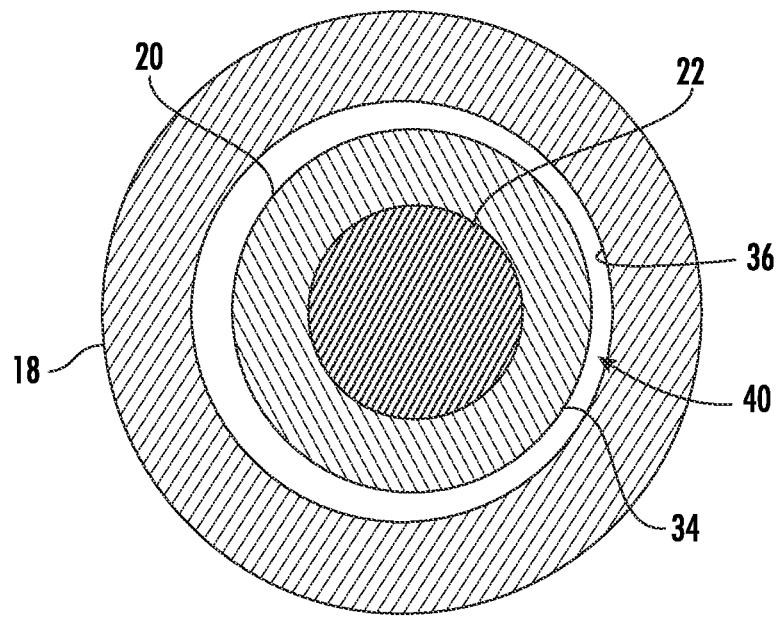
FIG. 4B is a cross-sectional view of a portion of another embodiment of the motor section constructed in accordance with the present disclosure.

In various embodiments of the present disclosure, the rotor 20 and stator 18 of the ESP 10 are designed in such a way to create a magnetic field across the air gap 32 that generates a radial force on the rotor 20 that is stationary relative to the stator 18 while the ESP 10 is operational. The radial force on the rotor 20 that is stationary relative to the stator 18 is a constant load on the rotor 20 and thus the shaft 22 that is secured thereto. The constant load on the rotor 20 and shaft 22 prevents imbalanced loads caused by operation of the ESP 10 from causing as much damage to the bearing assemblies 24 as would occur without the constant load. The constant loads can be generated by manipulating the geometric shape of the air gap 32. In one exemplary embodiment, FIG. 4B shows an eccentric air gap 40, which is created by positioning the rotor 20 closer to one part the inner surface 38 of the stator 18 than others. Where the eccentric air gap 40 is narrower, a higher radial force is generated relative to the stator 18. In this embodiment, the outer diameter of the rotor 20 and the inner diameter of the stator 18 are circular.

Figure 4C:
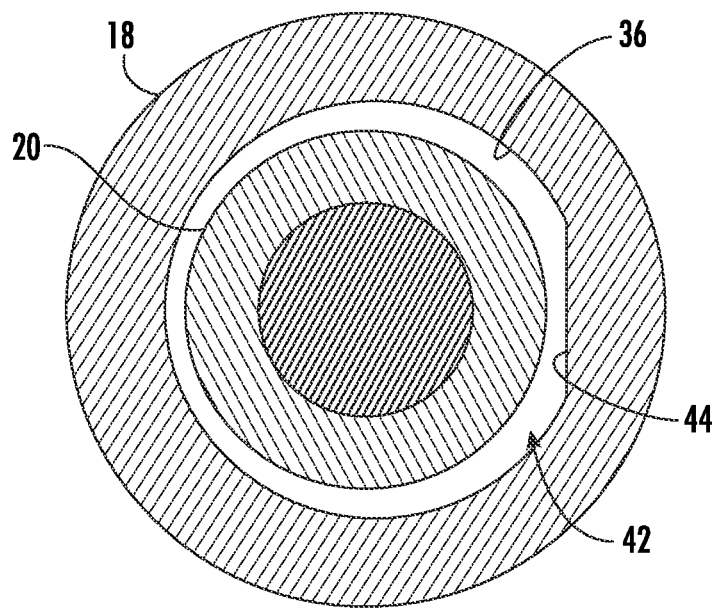
FIG. 4C is a cross-sectional view of a portion of yet another embodiment of the motor section constructed in accordance with the present disclosure.

In another embodiment shown in FIG. 4C, the ESP 10 has a flat-in air gap 42 wherein a portion of the inner surface 36 of the stator 18 has a flat section 44 that is closer to the rotor 20 than any other part of the inner surface 36 of the stator 18. The flat section 44 can be along the entire length of the stator 18, it can extend only a certain length of the stator 18 or there can be multiple flat sections 44 disposed on the inner surface 36 of the stator 18. In one embodiment, if the inner surface 36 of the stator 18 has multiple flat sections 44 disposed thereon, the flat sections 44 would be in line in the axial direction on the inner surface 36 of the stator 18.

Figure 4D:
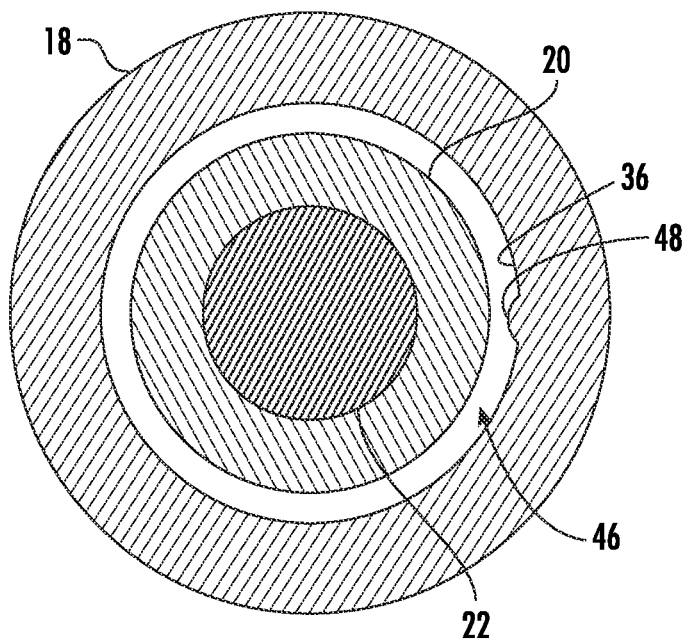
FIG. 4D is a cross-sectional view of a portion of another embodiment of the motor section constructed in accordance with the present disclosure.

In yet another embodiment shown in FIG. 4D, the ESP 10 has a nodule-in air gap 46 wherein a portion of the inner surface 36 of the stator 18 has a nodule 48 disposed thereon. The nodule 48 is closer to the rotor 20 than any other part of the inner surface 36 of the stator 18. The inner surface 36 of the stator can include a single nodule 48 or multiple nodules 48. In one embodiment, if the inner surface 36 of the stator 18 has multiple nodules 48 disposed thereon, the nodules 48 would be in line in the axial direction on the inner surface 36 of the stator 18. In a further embodiment, the multiple nodules 48 could be any size and distributed on the inner surface 36 of the stator 18 in any type of array to achieve the desired operational characteristics of the ESP 10.

Figure 5A:
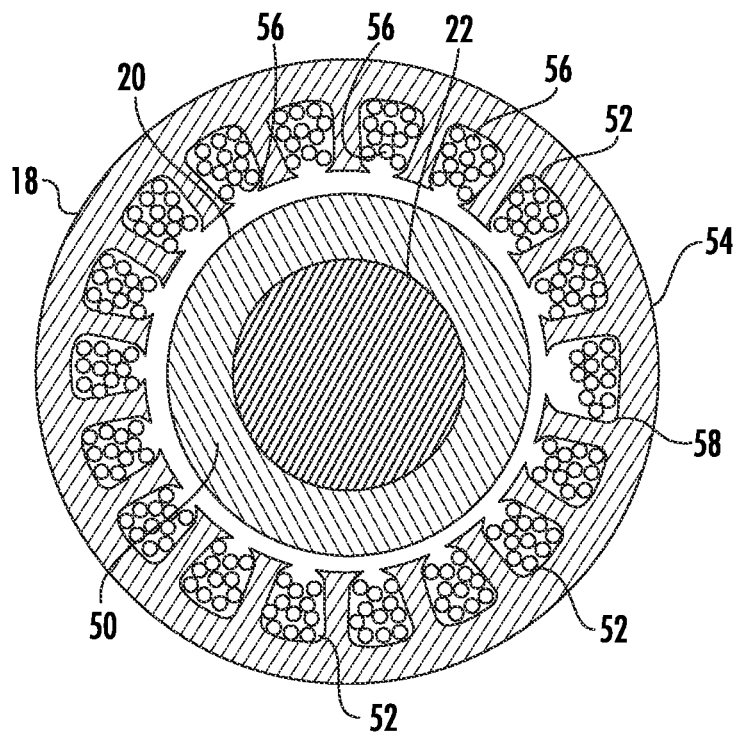
FIG. 5A is a cross-sectional view of a portion of a further embodiment of the motor section constructed in accordance with the present disclosure.
Figure 5B:
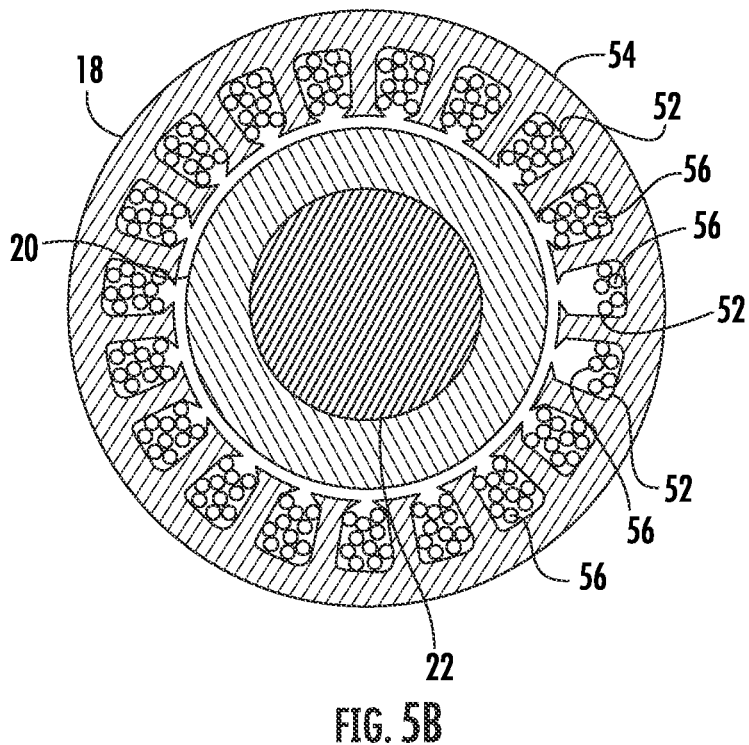
FIG. 5B is a cross-sectional view of a portion of an even further embodiment of the motor section constructed in accordance with the present disclosure.

Referring now to FIGS. 5A and 5B, the stator 18 includes a body 50 with winding channels 52 that extend axially through the body 50 of the stator 18. The body 50 of the stator 18 is part of the stator 18 that is between the inner surface 36 and an outer surface 54 of the stator 18. The winding channels 52 allow for a place where windings 56 can be placed within the body 50 of the stator 18 to create the electromagnetic field across the air gap 32.

In a further embodiment of the present disclosure shown in more detail in FIG. 5A, another way to create the magnetic field across the air gap 32 that generates a radial force on the rotor 20 that is stationary relative to the stator 18 while the ESP 10 is operational is shown (i.e. constant load). To create the constant load, the size and shape of the winding channels 52 in the stator 18 are manipulated. The stator 18 can have many winding channels 52 disposed within its body 50. The size and shape of the winding channels 52 in the stator 18 can be varied to generate the desired constant load described herein. In one exemplary embodiment, one of the winding channels 52 is bigger than all of the other winding channels 52 (i.e. can have larger radial cross-sectional shape—a cross section that is perpendicular to the length of the winding channels) and all of the other winding channels 52 are the same size. This imbalanced winding spacing creates the radial force on the rotor 20 that is stationary relative to the stator 18 (i.e. constant load). The number of windings 56 in the larger winding channel 58 can be more, less or the same as the number of windings 56 in the other winding channels 52 that have the uniform radial cross-sectional shape.

In yet another embodiment shown in more detail in FIG. 5B, another way to create the constant load. To create the constant load, the number of windings 56 in the winding channels 52 can be varied. In an exemplary embodiment, the stator 18 can have a plurality of uniform radial cross-sectionally shaped winding channels 52 disposed in the body 50 of the stator 18. A subset of the uniformly shaped winding channels 52 have less windings 56 disposed therein than the other uniformly shaped winding channels 52. In this embodiment, the subset of the uniformly shaped winding channels can be two or more. The winding channels 52 not a part of the subset can all have the same number of windings 56 disposed therein. The number of windings 56 in each winding channel 52 of the subset can have any number of windings 56 disposed therein so long as there are less windings 56 than in each of the winding channels 52 not a part of the subset. In one embodiment, the number of windings 56 in each winding channel 52 of the subset is half the number of windings 56 disposed in each of the winding channels 52 not a part of the subset. In a further embodiment, the number of windings 56 in each winding channel 52 of the subset is less than 75% of the number of windings 56 disposed in each of the winding channels 52 not a part of the subset. In yet another embodiment, the number of windings 56 in each winding channel 52 of the subset is less than 50% of the number of windings 56 disposed in each of the winding channels 52 not a part of the subset.

The embodiments shown in FIGS. 5A and 5B have been described with the understanding that the air gap 32 is symmetrical, but it should be understood and appreciated that the air gap 32 can have any of the shapes and features described herein. Therefore, numerous ways are described herein for providing the constant load to the ESP 10. It should be understood and appreciated that any of the embodiments described herein can be combined to generate the constant load.

The present disclosure is also directed toward a method of designing and constructing an ESP 10 that has a constant load as described herein. The extent of the desired constant load can be determined and a stator 18 and rotor 20 can be designed and constructed that can have any of the features described herein. The air gap 32 can be manipulated in any manner described herein to generate the desired constant load for the ESP 10.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. An electric submersible pump (ESP), the ESP comprising:
    a motor section for driving the ESP, the motor section including:
        a stator having winding channels disposed axially therein and windings disposed in the winding channels to generate an electromagnetic field when power is supplied to the ESP, the stator having an inner surface;
        a rotor rotatably disposed in the stator, the rotor having permanent magnets or induction windings disposed therein that are responsive to the electromagnetic field to facilitate rotation of the rotor relative to the stator;
        an asymmetrical air gap created from manipulation of the inner surface of the stator, the asymmetrical air gap disposed between the rotor and the stator that the electromagnetic field crosses, the asymmetrical air gap provides a desired constant radially directed load on the rotor to stabilize the rotor when instability of the motor section occurs; and
        wherein the winding channels disposed in the stator are closed off from the asymmetrical air gap.

2. The ESP of claim 1 wherein the rotor is disposed offset from a centerline in the stator wherein a portion of outer surface of the rotor is closer to a portion of an inner surface of the stator than any other part of the outer surface of the rotor.

3. The ESP of claim 1 wherein the inner surface of the stator has a flat section to affect the electromagnetic field and cause the desired constant radially directed load.

4. The ESP of claim 1 wherein the inner surface of the stator has at least one nodule disposed thereon to affect the electromagnetic field and cause the desired constant radially directed load.

5. A method, the method comprising:
    determining a desired constant radially directed load for an electric submersible pump (ESP) to stabilize the ESP when instability of an electromagnetic field of the ESP occurs;
        manipulating an air gap to create an asymmetrical air gap created from manipulation of an inner surface of a stator having winding channels disposed therein, the asymmetrical air gap in the ESP between the rotor and the stator to achieve the desired constant radially directed load on the rotor to achieve the desired constant radially directed load the winding channels disposed in the stator are closed off from the asymmetrical air gap; and
    constructing the ESP.

6. The method of claim 5 wherein the ESP comprises:
    a motor section for driving the ESP, the motor section including:
        the stator having winding channels disposed axially therein and windings disposed in the winding channels to generate an electromagnetic field when power is supplied to the ESP, the stator having an inner surface;
        the rotor disposed in the stator, the rotor having permanent magnets or induction windings disposed therein that are responsive to the electromagnetic field to facilitate rotation of the rotor relative to the stator; and
        the asymmetrical air gap disposed between the rotor and the stator that the electromagnetic field crosses, the asymmetrical air gap provides a desired constant radially directed load on the rotor to stabilize the rotor when instability of the motor section occurs.

7. The method of claim 6 wherein the rotor is disposed offset from a centerline in the stator wherein a portion of outer surface of the rotor is closer to a portion of an inner surface of the stator than any other part of the outer surface of the rotor.

8. The method of claim 6 wherein the inner surface of the stator has a flat section to affect the electromagnetic field and cause the desired constant radially directed load.

9. The method of claim 6 wherein the inner surface of the stator has at least one nodule disposed thereon to affect the electromagnetic field and cause the desired constant radially directed load.

10. An electric submersible pump (ESP), the ESP comprising:
    a motor section for driving the ESP, the motor section including:
        a stator having winding channels disposed axially therein and windings disposed in the winding channels to generate an electromagnetic field when power is supplied to the ESP, the stator having an inner surface;
        a rotor rotatably disposed in the stator, the rotor having permanent magnets or induction windings disposed therein that are responsive to the electromagnetic field to facilitate rotation of the rotor relative to the stator; and wherein at least one of the winding channels disposed in the stator is larger than each of the other winding channels disposed in the stator to affect the electromagnetic field and cause a desired constant radially directed load on the rotor to stabilize the rotor when instability of the motor section occurs.

11. The ESP of claim 10 wherein the larger winding channel includes same number of windings as each of the other winding channels disposed in the stator.

12. The ESP of claim 10 wherein at least one of the winding channels has fewer windings disposed therein than each of the other winding channels in the stator to affect the electromagnetic field and cause the desired constant radially directed load.

13. The ESP of claim 12 wherein two of the winding channels has fewer windings disposed therein than each of the other winding channels in the stator.

14. The ESP of claim 13 wherein the total number of windings in the two winding channels that have fewer windings disposed therein than each of the other winding channels in the stator is equal to the number of windings in each of the other winding channels.

15. A method, the method comprising:
determining a desired constant radially directed load for an electric submersible pump (ESP) to stabilize the ESP when instability of an electromagnetic field of the ESP occurs;
adjusting the size of at least one winding channel disposed in a stator to be larger than all other winding channels disposed in the stator to affect the electromagnetic field and cause the desired constant radially directed load on the rotor to stabilize the rotor when instability of the motor section occurs; and
constructing the ESP.

16. The method of claim 15 wherein the ESP comprises:
a motor section for driving the ESP, the motor section including:
the stator having the winding channels disposed axially therein and windings disposed in the winding channels to generate an electromagnetic field when power is supplied to the ESP, the stator having an inner surface; and
a rotor disposed in the stator, the rotor having permanent magnets or induction windings disposed therein that are responsive to the electromagnetic field to facilitate rotation of the rotor relative to the stator.

17. The method of claim 16 wherein the larger winding channel includes same number of windings as each of the other winding channels disposed in the stator.

18. The method of claim 16 wherein at least one of the winding channels has fewer windings disposed therein than each of the other winding channels in the stator to affect the electromagnetic field and cause the desired constant radially directed load.

19. The method of claim 18 wherein two of the winding channels has fewer windings disposed therein than each of the other winding channels in the stator.

20. The method of claim 19 wherein the total number of windings in the two winding channels that have fewer windings disposed therein than each of the other winding channels in the stator is equal to the number of windings in each of the other winding channels.

* * * * *